United States Patent
Rabadi et al.

(10) Patent No.: US 8,856,536 B2
(45) Date of Patent: Oct. 7, 2014

(54) METHOD AND APPARATUS FOR SECURE FIRMWARE DOWNLOAD USING DIAGNOSTIC LINK CONNECTOR (DLC) AND ONSTAR SYSTEM

(75) Inventors: Nader M. Rabadi, Grand Forks, ND (US); Kevin M. Baltes, Wixom, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 148 days.

(21) Appl. No.: 13/327,216

(22) Filed: Dec. 15, 2011

(65) Prior Publication Data

US 2013/0159717 A1      Jun. 20, 2013

(51) Int. Cl.
    *H04L 9/30*    (2006.01)
    *G06F 9/44*    (2006.01)
    *G06F 17/00*    (2006.01)

(52) U.S. Cl.
    CPC .. *H04L 9/30* (2013.01); *G06F 9/44* (2013.01); *G06F 17/00* (2013.01)
    USPC ............ 713/176; 713/193; 713/187; 713/191

(58) Field of Classification Search
    CPC .............. H04L 9/30; G06F 9/44; G06F 17/00
    USPC .................................. 713/176, 193, 187, 191
    See application file for complete search history.

(56) References Cited

U.S. PATENT DOCUMENTS

| | | | |
|---|---|---|---|
| 6,601,212 B1 | 7/2003 | Guha | |
| 7,069,452 B1 * | 6/2006 | Hind et al. | 713/1 |
| 7,672,763 B1 | 3/2010 | Hunt | |
| 7,778,752 B1 | 8/2010 | Hunt | |
| 8,050,817 B2 | 11/2011 | Moinzadeh | |

(Continued)

FOREIGN PATENT DOCUMENTS

| | | |
|---|---|---|
| WO | WO 2008/054058 A1 | 5/2008 |
| WO | WO 2009/117896 A1 | 10/2009 |
| WO | WO 2011/006378 A1 | 1/2011 |

OTHER PUBLICATIONS

Nilsson et al. , A Framework for Self-Verification of Firmware Updates over the Air in Vehicle ECUs, Jun. 26, 2009, IEEE, pp. 1-5.*

(Continued)

*Primary Examiner* — Jeffrey Pwu
*Assistant Examiner* — Samuel Ambaye
(74) *Attorney, Agent, or Firm* — John A. Miller; Miller IP Group, PLC

(57) ABSTRACT

A method for authenticating a piece of firmware to be downloaded to a controller. The method includes signing the firmware or a first part of the firmware with a first private key at a first trusted source and signing the firmware or a second part of the firmware with a second private key at a second trusted source. The method also includes validating the signed firmware or the first part of the firmware using a first public key at the controller and validating the firmware or the second part of the firmware using a second public key at the controller. The method further includes authenticating the firmware if the firmware or the first part of the firmware is validated by the first public key at the controller and the firmware or the second part of the firmware is validated by the second public key at the controller.

20 Claims, 2 Drawing Sheets

(56) References Cited

U.S. PATENT DOCUMENTS

| | | |
|---|---|---|
| 2004/0185842 A1* | 9/2004 | Spaur et al. .................. 455/420 |
| 2005/0065678 A1 | 3/2005 | Smith |
| 2006/0143600 A1 | 6/2006 | Cottrell |
| 2008/0027602 A1 | 1/2008 | Yeap |
| 2009/0119657 A1 | 5/2009 | Link, II |
| 2009/0259349 A1 | 10/2009 | Golenski |
| 2009/0327741 A1 | 12/2009 | Zimmer |
| 2010/0130160 A1 | 5/2010 | Fayyad |
| 2011/0166742 A1 | 7/2011 | Hunt |
| 2011/0201302 A1 | 8/2011 | Hatton |
| 2011/0239211 A1 | 9/2011 | Kim |

OTHER PUBLICATIONS (Disclosed Anonymously), "Vehicle Charging and Information Sharing", IP.com No. IPCOM000212734D, pp. 1-2, Nov. 26, 2011.

Nilsson, Dennis K. "Secure Firmware Updates over the Air in Intelligent Vehicles", Communictions Workshops, ICCC 2008, IEEE International, May 19-23, 2008, pp. 380-384.

Nilsson, Dennis K. "A Framework for Self-Verification of Firmware Updates over the Air in Vehicle ECUs", Globecom Workshops, 2008 IEEE Internatinal Conference, Nov. 30-Dec. 4, 2008, pp. 1-5.

* cited by examiner

METHOD AND APPARATUS FOR SECURE FIRMWARE DOWNLOAD USING DIAGNOSTIC LINK CONNECTOR (DLC) AND ONSTAR SYSTEM

BACKGROUND OF THE INVENTION

1. Field of the Invention

This invention relates generally to a system and method for securely downloading firmware to a vehicle electronic control unit (ECU) and, more particularly, to a system and method for securely downloading firmware to a vehicle ECU that includes verifying that the firmware is authentic by validating the firmware using two separate trusted sources.

2. Discussion of the Related Art

Many modern vehicles include electronic control units (ECUs), or controllers, which control the operation of vehicle systems, such as the powertrain, climate control system, infotainment system, body systems, chassis systems, and others. Such controllers require special purpose-designed software, i.e., application code and calibrations, in order to perform the control functions. With the increasing number and complexity of these controllers, and the growing threat posed by developers of malicious software, it is more important than ever to authenticate the source and content of binary files which are loaded on automotive controllers. The consequences of using software which is not properly validated, or worse, maliciously-designed, in a vehicle controller include unintended behavior of the vehicle or its systems, loss of anti-theft features on the vehicle, potential tampering with components such as the odometer, and loss of other vehicle features and functions.

One know digital coding technique is referred to as asymmetric key cryptography that uses digital signatures for authenticating files that are programmed into controllers. As is understood by those skilled in the art, asymmetric key cryptography uses a pair of mathematically-related keys, known as a private key and a public key, to encrypt and decrypt a message. To create a digital signature, a signer uses his private key, which is known only to himself, to encrypt a message. The digital signature can later be decrypted by another party using the public key, which is paired to the signer's private key.

Flashing is a well known process for downloading software, calibration files and other applications into the memory of a vehicle ECU or other programmable device. A bootloader is an embedded software program loaded in the memory of the ECU that provides an interface between the ECU and computer device that is downloading the software. The bootloader flashes the operating software and calibration files into the ECU memory, where the operating software provides the software that causes the various vehicle functions to operate in conjunction with each other and the calibration files are the various vehicle parameters, such as pressures, temperatures, etc., for the particular vehicle systems. The bootloader typically employs asymmetric key cryptography and stores a public key that must be used to decode a digital signature transferred by the uploading computer before downloading to or reflashing of the ECU is allowed to prevent malicious software or calibration files from being downloaded into the ECU.

Known digital coding techniques, such as asymmetric key cryptography that uses digital signatures referred to above, are very good at preventing potential hackers from flashing unauthentic software into the ECU. However, alternate forms of malicious attacks to firmware to be downloaded to a vehicle ECU can come from within an organization that has knowledge of the public and private keys, where the potential hacker somehow gains access to the public and private keys without having to decrypt them.

SUMMARY OF THE INVENTION

In accordance with the teachings of the present invention, a system and method are disclosed for verifying that firmware to be downloaded to a vehicle ECU is authentic by using two separate trusted sources to verify the firmware. In one embodiment, the method includes separating the firmware into a first firmware part and a second firmware part, and signing the first firmware part with a first private key at a first trusted source. The first trusted source hashes the second firmware part and sends the hashed second firmware part to a second trusted source. The second trusted source signs the hashed second firmware part using a second private key and the first trusted source sends the firmware and the signature of the first firmware part to a downloading tool. The vehicle requests the firmware and the signature of the first firmware part from the downloading tool and requests the signature of the second firmware part from the second trusted source. The second trusted source sends the signature of the second firmware part to the vehicle, and the vehicle validates the signature of the first firmware part using a first public key and validates the signature of the second firmware part using a second public key. If both parts are validated, the vehicle executes the firmware.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for authenticating a firmware file to be downloaded to a vehicle ECU by validating the firmware through two separate trusted sources is merely exemplary in nature, and is in no way intended to limit the invention or its applications or uses. For example, the present invention has particular application for downloading firmware to a vehicle ECU. However, as will be appreciated by those skilled in the art, the verifying technique may have application for downloading firmware and/or software to other controllers.

Figure 1:
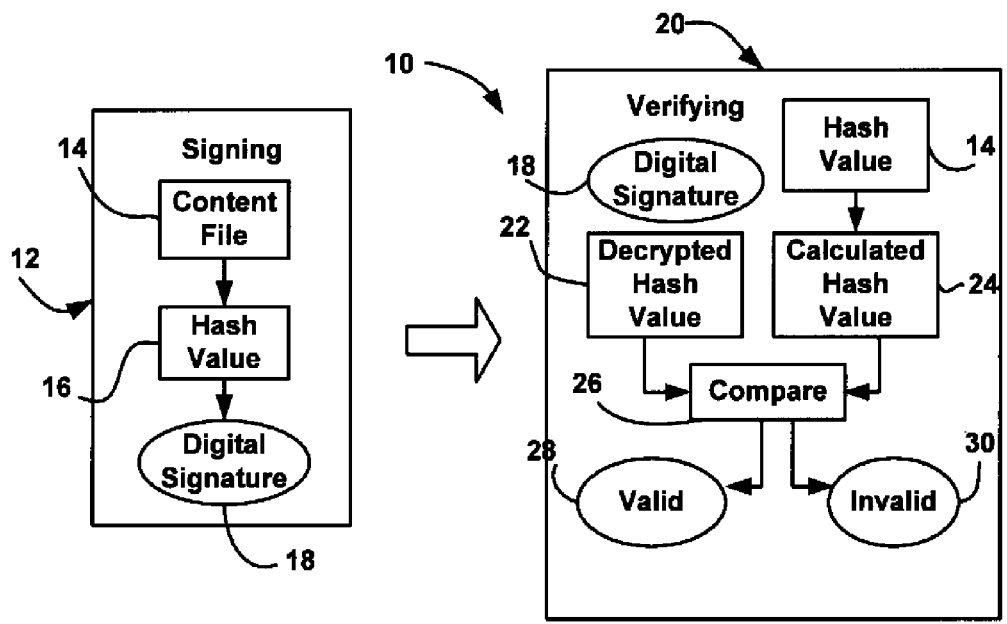
FIG. 1 is a block diagram of a system showing the operation of a signature verification process.

FIG. 1 is a block diagram 10 of a known method for using asymmetric key digital signatures for authenticating files that are programmed into controllers. As would be understood by those skilled in the art, asymmetric key cryptography uses a pair of mathematically-related keys known as a private key and a public key to encrypt and decrypt a message. To create a digital signature, a signer uses his private key, which is known only to himself, to encrypt a file. The digital signature can later be decrypted by another party using the public key, which is paired to the signer's private key to authenticate a file or message.

In a signing step 12, a content file 14 is provided, where the content file 14 could be a piece of software, firmware, a calibration file, or other content to be used in a controller. A cryptographic hash calculation is performed on the content file 14 to produce a hash value or digest 16. The hash value 16 is then encrypted with the signer's private key to produce a digital signature 18, where the digital signature 18 is only good for that particular content file.

The digital signature 18 and the content file 14 are then used in a verifying step 20, which would be performed by the bootloader in the ECU in the application being discussed herein. The digital signature 18 is decrypted using the signer's public key to produce a decrypted hash value 22. Meanwhile, a hash calculation is performed on the flash memory programmed by the contents of the file 14 by the verifier, to produce a calculated hash value 24. At box 26, the decrypted hash value 22 is compared to the calculated hash value 24. If the decrypted hash value 22 matches the calculated hash value 24, then a valid determination 28 is issued, and the flash memory programmed by the content file 14 is used. If the decrypted hash value 22 does not match the calculated hash value 24, then an invalid determination 30 is issued, and the flash memory programmed with the content file 14 is not used.

The present invention proposes a technique for using asymmetric digital key signatures of the type discussed above for verifying that firmware to be downloaded to a vehicle ECU is authentic, where the method includes verifying that the firmware is authentic by using two separate trusted sources, such as the vehicle manufacturer and OnStar™, where each signs messages using its own private key. The connections to the vehicle can be telematic connections where the two trusted sources can be servers separated geographically to make it more difficult to compromise the private keys used to create the digital signatures.

Figure 2:
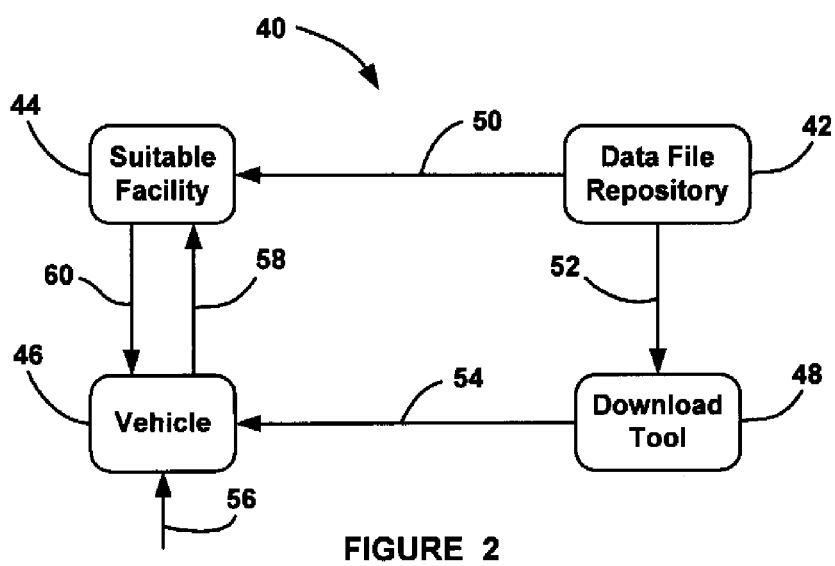
FIG. 2 is a flow chart diagram showing a process for authenticating a firmware file to be downloaded to a vehicle where the vehicle includes a telematics system such as OnStar™.

FIG. 2 is a flow chart diagram 40 showing a process for verifying that firmware to be downloaded to a vehicle ECU is authentic using two separate trusted sources. For the discussion below, the first trusted source is the vehicle manufacturer, but can be any trusted source that provides the firmware file to be downloaded, such as a supplier. Further, as this is a General Motors assigned application, the second trusted source is OnStar™, but can be any other suitable trusted source that is separate from the first trusted source. In the discussion below, the vehicle manufacturer will have a private key MPv and a public key MPu, OnStar™ will have a private key ONPv and a public key ONPu, the firmware is defined as FW, and may be split into two parts defined as FW1 and FW2, a hash function is defined as H( ) and a signature of a message m using a private key p is defined as Sig(p,m).

In the diagram 40, a data file repository where the firmware FW is stored and/or obtained from is designated by box 42. The repository 42 can be any suitable facility, server, location, etc. that is capable of receiving firmware from a vehicle manufacturer, supplier, etc., store the firmware in a secure location and transmit the firmware in any suitable manner, such as wirelessly, over the internet, over the telephone lines, etc. It is assumed that the data file repository 42 securely receives the firmware FW. Box 44 represents an OnStar™ facility and is any suitable facility that provides the OnStar™ operations, well known to those skilled in the art, which can be in wireless communication with a vehicle represented by box 46. Although the OnStar™ facility 44 is used as one of the trusted sources in this example, it will be understood by those skilled in the art that this is by way of a non-limiting example in that any suitable trusted source can be used. Box 48 represents a tool that is used to download the firmware FW to the ECU on the vehicle 46. The tool 48 can be any suitable computer related device that a service facility, manufacturer, etc. would employ to perform this operation. The vehicle 46 and the tool 48 would be at the same location, where the tool 48 would be connected to the vehicle 46 through a diagnostic link connector (DLC) well known to those skilled in the art.

The firmware FW is split into first and second firmware parts FW1 and FW2 at the repository 42. The data file repository 42 will use a hash function to hash the first firmware part FW1 and then encrypt the hashed first firmware part FW1 using the manufacturer's private key MPv to generate the signature Sig(MPv, H(FW1)). Further, the data file repository 42 will use a hash function to hash the second firmware part FW2 and send the hashed second firmware part FW2 as a message H(FW2) to the OnStar™ facility 44 on line 50. The file transfer from the repository 42 to the OnStar™ facility 44 can be any suitable connection, such as wirelessly or over the telephone lines. The OnStar™ facility 44 will sign the hash of the second firmware part FW2 using the OnStar™ private key ONPv to generate the signature Sig(ONPv, H(FW2)). It is noted that the OnStar™ facility 44 does not have the firmware files FW, FW1 or FW2. It is also noted that the data file repository 42 will hash and sign the first firmware part FW1, hash the second firmware FW2 and send the hashed second firmware part H(FW2) to the OnStar™ facility 44 at some time near to when the repository 42 receives the firmware part FW from the manufacturer or supplier, and before the firmware FW is actually needed to be downloaded to the vehicle ECU.

The data file repository 42 also provides the firmware FW and the signature Sig(MPv, H(FW1)) to the tool 48 on line 52. The connection between the repository 42 and the tool 48 can be any suitable connection for the purposes discussed herein, such as a telematic connection, an internet connection, etc. When the tool 48 is connected to the vehicle 46 by the DLC for downloading the firmware FW, the tool 48 downloads the firmware FW and the signature Sig(MPv, H(FW1)) that it has received and stored from the data file repository 42 on line 54. The repository 42 may provide the firmware FW and the hashed and signed first firmware part FW1 to be stored at the tool 48 before the vehicle 46 requests it to be downloaded. It may be desirable to require the vehicle 46 to enter a password, represented by line 56, to the ECU that identifies the proper user of the vehicle 46 before proceeding with the firmware download. The password entry may be performed prior to the tool 48 downloading the firmware FW and the signature Sig(MPv, H(FW1)) to the vehicle 46.

The vehicle 46 then through the OnStar™ telematics link requests the signature of the second firmware part FW2 on line 58, and the OnStar™ facility 44 provides the signature Sig(ONPv, H(FW2)) to the vehicle 46 on line 60. To accept the firmware FW provided by the tool 48, the ECU on the vehicle 46 will validate the firmware FW by validating the signature Sig(MPv, H(FW1)) using the manufacturers public key MPu and by validating the signature Sig(ONPv, H(FW2)) from the OnStar™ facility 44 using the OnStar™ public key ONPu. If both parts of the message are validated, then the ECU on the vehicle 46 allows the firmware FW to be executed.

Although the discussion above separates the firmware FW into the two parts FW1 and FW2, this requirement could be quite complex for calculation purposes. In an alternate embodiment, the firmware FW is not separated, where the entire piece of firmware FW is hashed in the data file repository 42 to be sent to the OnStar™ facility 44. The entire piece of firmware FW is signed using the manufacturers private key MPv at the data file repository 42 to generate the signature Sig(MPv, H(FW)). The OnStar™ facility 44 will sign the hash of the firmware part FW using the OnStar™ private key ONPv to generate the signature Sig(ONPv, H(FW)).

Figure 3:
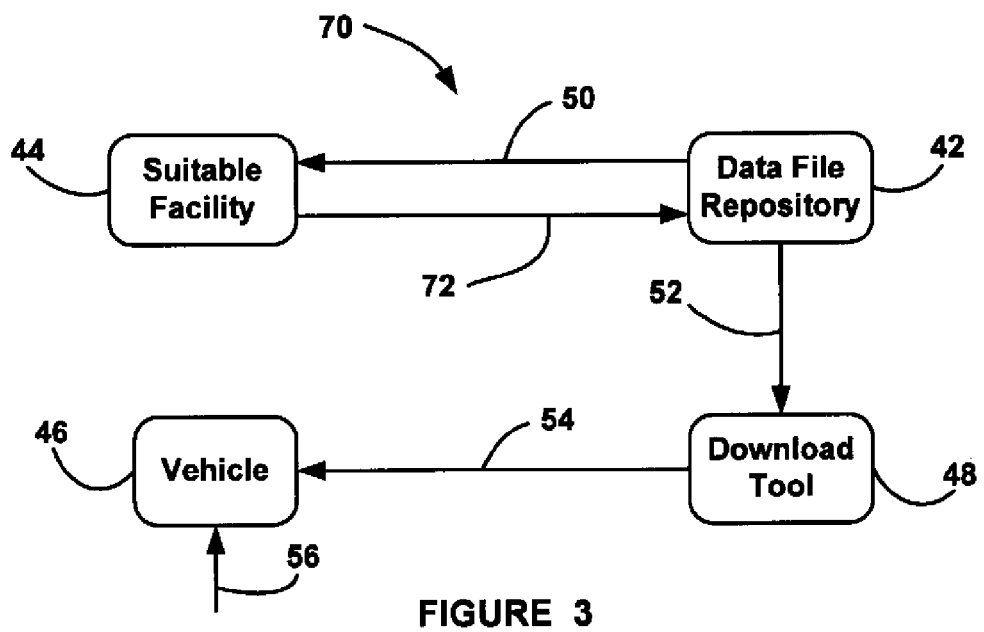
FIG. 3 is a flow chart diagram showing a process for authenticating a firmware file to be downloaded to a vehicle where the vehicle does not have OnStar™.

FIG. 3 is a flow chart diagram 70 showing another operation for validating the firmware FW to be downloaded to a vehicle ECU having the same facilities and elements as the diagram 40, but where the vehicle 46 does not have an OnStar™ subscription, and thus, is not able to receive any signatures directly from the OnStar™ facility 44. As above, the data file repository 42 hashes the second firmware part FW2 and sends it to the OnStar™ facility 44 on the line 50, where the OnStar™ facility 44 signs the hash value using the OnStar™ private key ONPv. Because the OnStar facility 44 is not able to send the signature of the second firmware part FW2 to the vehicle 46, the OnStar™ facility 44 sends the signature of the second firmware part FW2 to the data file repository 42 on line 72. Now the data file repository 42 has both the signed first firmware part Sig(MPv, H(FW1)) and the signed second firmware part Sig(ONPv, H(FW2)) from the OnStar™ facility 44, and provides these messages and the firmware FW to the tool 48 when requested. The tool 48 then downloads all of the firmware FW and signatures on the DLC line 54, where the ECU in the vehicle 46 separately validates the two signatures using the manufactures public key MPu and the OnStar™ public key ONPu to validate the firmware FW.

Figure 4:
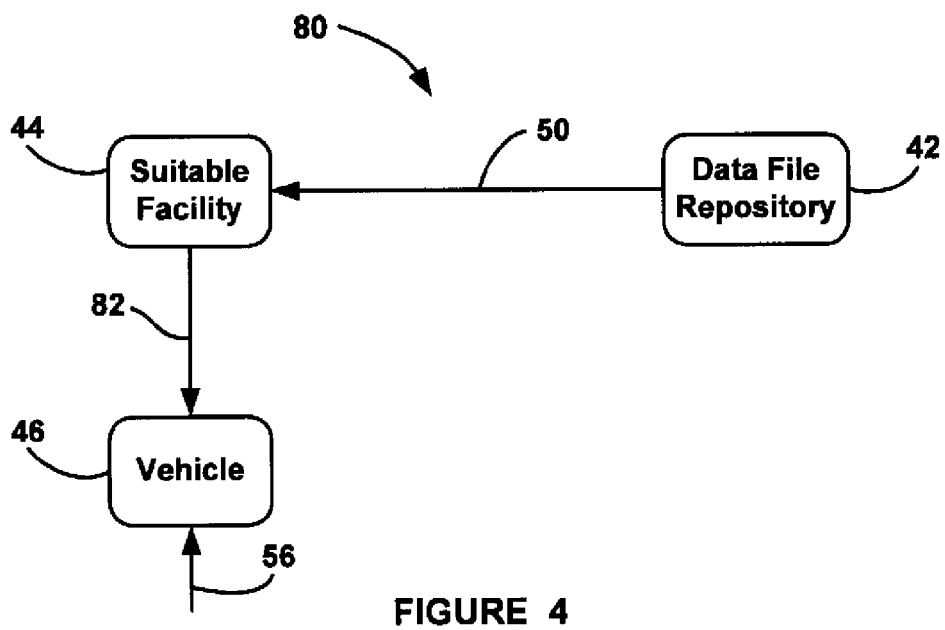
FIG. 4 is a flow chart diagram showing a process for authenticating a firmware file to be downloaded to a vehicle ECU only using OnStar™.

FIG. 4 is a flow chart diagram 80 similar to the flow chart diagrams 40 and 50, where like elements and facilities are identified by the same reference numeral. In this embodiment, the tool 48 is not used to download the firmware FW to the vehicle 46, but the firmware FW is downloaded directly from the OnStar™ facility 44. The data file repository 42 provides the firmware FW, the second firmware part FW2 and the signed first firmware part Sig(MPv, H(FW1)) to the OnStar™ facility 44 on the line 50. In this embodiment, the repository 42 does not hash the second firmware part FW2, but provides it along with the entire firmware file FW. The OnStar™ facility 44 first hashes and then signs the hash of the second firmware part FW2 using the OnStar™ private key ONPv to calculate the signature Sig(ONPv, H(FW2)). If the firmware FW is to be downloaded to the vehicle 46 from the OnStar™ facility 44, all of the firmware FW, the signature of the first firmware part Sig(MPv, H(FW1)) and the signature of the second firmware part Sig(ONPv, H(FW2)) are telematically transmitted to the vehicle 46 on line 82, which validates each signature separately to verify the authenticity of the firmware FW.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for authenticating a piece of firmware that is to be downloaded to a vehicle ECU, said method comprising:
separating the firmware into a first firmware part and a second firmware part;
hashing the first firmware part using a hash function at a first trusted source;
encrypting the hash of the first firmware part with a first source private key to create a signature at the first trusted source;
hashing the second firmware part using a hash function at the first trusted source;
sending the hashed second firmware part to a second trusted source;
encrypting the hash of the second firmware part with a second source private key to create a signature at the second trusted source;
sending the firmware and the signature of the first firmware part from the first trusted source to a downloading tool;
requesting the firmware and the signature of the first firmware part from the downloading tool;
requesting the signature of the second firmware part from the second trusted source;
sending the signature of the second firmware part to the vehicle from the second trusted source;
validating the signature of the first firmware part in the vehicle using a first source public key;
validating the signature of the second firmware part in the vehicle using a second source public key; and
authenticating the firmware in the ECU if both the first and second firmware parts are valid.

2. The method according to claim 1 wherein the first trusted source is a vehicle manufacturer.

3. The method according to claim 2 wherein the second trusted source is OnStar™.

4. The method according to claim 1 further comprising entering a password in the vehicle to authorize the vehicle before requesting the signed signature of the second firmware part.

5. A method for authenticating a piece of firmware to be downloaded to a controller, said method comprising:
signing the firmware or a first part of the firmware with a first private key at a first trusted source;
signing the firmware or a second part of the firmware with a second private key at a second trusted source;
validating the signed firmware or the first part of the firmware using a first public key at the controller;
validating the firmware or the second part of the firmware using a second public key at the controller; and
authenticating the firmware for use if the firmware or the first part of the firmware is validated by the first public key at the controller and the firmware or the second part of the firmware is validated by the second public key at the controller.

6. The method according to claim 5 further comprising hashing the firmware or the first part of the firmware prior to the firmware or the first part of the firmware being signed and hashing the firmware or the second part of the firmware prior to the firmware or the second part of the firmware being signed, and wherein signing the firmware or the first part of the firmware with a first private key includes signing the hash of the firmware or the first part of the firmware and signing the firmware or the second part of the firmware with a second private key includes signing the hash of the firmware or the second part of the firmware.

7. The method according to claim 5 wherein signing the firmware or the second part of the firmware with a second private key at a second trusted source includes providing the firmware from a data file repository to the second trusted source to be signed.

8. The method according to claim 7 further comprising returning the signed firmware or the second part of the firmware from the second trusted source back to the data file repository.

9. The method according to claim 8 further comprising providing the firmware, the signed firmware or the first part of the firmware and the signed firmware or the second part of the firmware from the data file repository to a downloading tool.

10. The method according to claim 5 further comprising providing the signed firmware or the first part of the firmware to a downloading tool from the first trusted source and providing the signed firmware or the second part of the firmware to the controller from the second trusted source.

11. The method according to claim 5 further comprising providing the firmware or the second part of the firmware and the signed firmware or the first part of the firmware from the first trusted source to the second trusted source and providing the firmware, the signed firmware or the second part of the firmware and the signed firmware or the first part of the firmware from the second trusted entity to the controller.

12. The method according to claim 5 further comprising providing a password to the controller before downloading the firmware.

13. The method according to claim 5 wherein the first trusted source is a vehicle manufacturer.

14. The method according to claim 13 wherein the second trusted source is OnStar™.

15. The method according to claim 14 wherein the controller is an ECU on a vehicle.

16. A system for authenticating a piece of firmware to be downloaded to a controller, said system comprising:
   means for signing the firmware or a first part of the firmware with a first private key at a first trusted source;
   means for signing the firmware or a second part of the firmware with a second private key at a second trusted source;
   means for validating the signed firmware or the first part of the firmware using a first public key at the controller;
   means for validating the firmware or the second part of the firmware using a second public key at the controller; and
   means for authenticating the firmware for use if the firmware or the first part of the firmware is validated by the first public key at the controller and the firmware or the second part of the firmware is validated by the second public key at the controller.

17. The system according to claim 16 further comprising means for hashing the firmware or the first part of the firmware prior to the firmware or the first part of the firmware being signed and hashing the firmware or the second part of the firmware prior to the firmware or the second part of the firmware being signed, and wherein the means for signing the firmware or the first part of the firmware with a first private key includes signing the hash of the firmware or the first part of the firmware and the means for signing the firmware or the second part of the firmware with a second private key signs the hash of the firmware or the second part of the firmware.

18. The system according to claim 16 further comprising means for providing the signed firmware or the first part of the firmware to a downloading tool from the first trusted source and providing the signed firmware or the second part of the firmware to the controller from the second trusted source.

19. The system according to claim 16 further comprising means for providing a password to the controller before downloading the firmware.

20. The system according to claim 16 wherein the first trusted source is a vehicle manufacturer, the second trusted source is OnStar™ and the controller is a vehicle ECU.

* * * * *